(12) United States Patent
Socolinsky et al.

(10) Patent No.: US 6,539,126 B1
(45) Date of Patent: Mar. 25, 2003

(54) VISUALIZATION OF LOCAL CONTRAST FOR N-DIMENSIONAL IMAGE DATA

(75) Inventors: Diego A. Socolinsky, Baltimore, MD (US); Lawrence B. Wolff, New York, NY (US)

(73) Assignee: Equinox Corporation, New York, NY (US)

( * ) Notice: Subject to any disclaimer, the term of this patent is extended or adjusted under 35 U.S.C. 154(b) by 0 days.

(21) Appl. No.: 09/292,740

(22) Filed: Apr. 16, 1999

Related U.S. Application Data (60) Provisional application No. 60/082,136, filed on Apr. 17, 1998.

(51) Int. Cl.$^7$ .............................. G06T 5/00; G06T 17/00

(52) U.S. Cl. ...................... 382/274; 345/617; 382/154

(58) Field of Search ................................. 382/274, 266, 382/254, 154; 345/428, 589, 617, 426

(56) References Cited

PUBLICATIONS

Rosenfeld, Azriel, et al, *Digital Picture Processing*, Second Edition, vol. 1, 1982, Academic Press.
Landgrebe, David, On Information Extraction Principles for Hyperspectral Data, Purdue University, Jul. 25, 1997.
Wolff, Lawrence B. et al, Theory and Analysis of Color Discrimination for the Computation of Color Edges Using Camera Sensors in Machine Vision, Computer Sciences Department Technical Paper pp. 515–518, The Johns Hopkins University.
Spivak, Michael, *A Comprehensive Introduction to Differential Geometry*, vol. 2, Second Edition, Publish or Perish, Inc.1975.
Press, William H. et al, Numerical Recipes in C, The Art of Scientific Computing, Cambridge University Press 1988.
Lillesand, Thomas M. et al, Remote Sensing and Image Interpretation, John Wiley & Sons, 1979.
Haralick, Robert M., Digital Step Edges from Zero Crossing of Second Directional Derivatives, Image Partitioning and Perpetual Organizations, Digital Stero Edges pp. 216–226.
Cumani, Aldo, Edge Detection in Multispectral Images, Graphic Models and Image Processing, vol. 53, No. 1, pps. 40–51, Jan. 1991.

(List continued on next page.)

*Primary Examiner*—Scott Rogers
(74) *Attorney, Agent, or Firm*—Jones, Tullar & Cooper, P.C.

(57) ABSTRACT

A method is presented for the treatment and visualization of local contrast in n-dimensional multispectral images, which directly applies to n-dimensional multisensor images as well. A 2×2 matrix called the contrast form is defined comprised of the first derivatives of the n-dimenional image function with respect to the image plane, and a local metric defined on n-dimensional photometric space. The largest eigenvector of this 2×2 contrast form encodes the inherent local contrast at each point on the image plane. It is shown how a scalar intensity function defined on n-dimensional photometric space is used to select a preferred orientation for this eigenvector at each image point in the n-dimensional image defining the contrast vector field for an n-dimensional image. A grey level visualization of local n-dimensional image contrast is produced by the greylevel image intensity function such that the sum of the square difference between the components of the gradient vector of this intensity function and the components of the contrast vector field is minimized across the image plane. This is achieved by solving the corresponding Euler-Lagrange equations for this variational problem. An m-dimensional image, 1<m<n, visualization of n-dimensional data is produced by an m-dimensional image function such that the sum of the square difference between the components of the contrast form of this m-dimensional image and the components of the contrast form for the n-dimensional image is minimized across the image plane.

15 Claims, 10 Drawing Sheets

OTHER PUBLICATIONS

Wilson, Terry A. et al, Perceptual–Based Image Fusion for Hyperspectral Data, IEEE Transactions on Geoscience and Remote Sensing, vol. 35, No. 4, pps. 1007–1017, Jul. 1997.

Hui Li, et al, Multi–Sensor Image Fusion Using the Wavelet Transform, IEEE pps. 51–55, 1994.

Socolinsky, Diego A. et al, Multispectral Image Visualization through First Order Fusion, The Johns Hopkins University, Oct. 26, 1999.

Ehlers, Manfred, Multisensor image fushion techniques in remote sensing, ISPRS Journal of Photogrammetry and Remote Sensing 46, pps. 19–30, 1991.

Toet, Alexander, et al, New false color mapping for image fusion, Optical Engineering, vol. 35, No. 3, pps. 650–658, Mar. 1996.

Toet, Alexander, et al, Merging thermal and visual images by a contrast pyramid, Optical Engineering, vol. 28, No. 7, pps. 789–792, Jul. 1989.

Scheunders, P., Multispectral Image Visualization using Local Self–Organizing Maps, Department of Physics, University of Antwerp, 1999.

Scribner, Dean, et al, Extending Color Vision Methods to Bands Beyond the Visible, Naval Research Laboratory.

Scribner, Dean, et al, Infrared Color Vision: An Approach to Sensor Fusion, Optics & Photonics News, pps. 28–32, Aug. 1998.

Zhou, Y.T., Multi–Sensor Image Fusion, IEEE, pps. 193–197, IEEE 1994.

Chiuderi, A, et al, Data Fusion Techniques for Remotely Sensed Images, Time–Varying Image Processing and Moving Object Recognition 3, pps. 249–256, Elsevier Science B.V. 1994.

Schmiedl, Udo, et al, The Utility of Principal Component Analysis for the Image Display of Brain Lesions, A Preliminary Comparative Study, Magnetic Resonance in Medicine 4, pps. 471–486, 1987.

Toet, Alexander, Multiscale contrast enhancement with applications to image fusion, Optical Engineering, vol. 31 No. 5, pps. 1026–1031, May 1992.

Manduca, Armando, Multispectral Image Visualization with Nonlinear Projections, IEEE Transactions on Image Processing, vol. 5, No. 10, pps. 1486–1490, Oct. 1996.

Harikumar, G., Feature Extraction Techniques for Exploratory Visualization of Vector–Valued Imagery, IEEE Transactions of Image Processing, vol. 5, No. 9, pps. 1324–1334, Sep. 1996.

VISUALIZATION OF LOCAL CONTRAST FOR N-DIMENSIONAL IMAGE DATA

This application claims benefit of Provisional No. 60/082,136 filed Apr. 17, 1998.

FIELD OF THE INVENTION

This invention relates to visualization of n-band multispectral/multisensor images that can be used by image analysts to better discriminate image data acquired by multispectral/multisensor systems. This invention can also be used by automated and semi-automated image understanding systems that utilize such n-band imagery. The invention can be used to aid the color blind in seeing local contrast in color images. This invention can also be used for image compression.

BACKGROUND OF THE INVENTION

The advent of new remote sensing and imaging technologies provides ever increasing volumes of multispectral data. Faced with this information explosion, it has become necessary to develop methods for analysis of such high dimensional datasets. One key aspect of this process is the visualization of multispectral data, to be used for photointerpretation. This allows an image analyst to determine regions of interest and important features in the image for further analysis or segmentation. In order to take full advantage of the human visual system, a Red-Green-Blue composite image is usually generated from the data by one of a number of statistical methods such as with Principal Components Analysis. The new method here produces a one-band, grayscale visualization image from a given multispectral dataset. This is done so as to preserve as much local image contrast 'feature information' as possible. An m-dimensional image, 1<m<n, visualization for an n-dimensional image can also be obtained most optimally preserving local contrast data.

SUMMARY OF THE INVENTION

Computation of contrast, which includes computation of gradient and zero-crossings, has been used in computer vision as one of the primary methods for extracting grayscale and color features. It seems plausible, therefore, that the correct way to compare versions of the same image in terms of feature information is through their contrast content. Contrast, however, is defined a priori only for grayscale images, so it is hard to readily compare multiband images amongst themselves or multiband images with grayscale images. The first step is thus to define contrast for a multiband image. This is achieved through the introduction of a differential form on the image, computed in terms of the spectral map and a metric defined on photometric space. This reduces to the standard notion of contrast in grayscale images.

Once contrast has been defined for an arbitrary image, it is natural to ask which grayscale image most closely matches the contrast information of a given multiband image. Or, how is it possible to convert a multiband image to grayscale while preserving as much contrast information as possible?

It should be noted that the solution to this problem has multiple applications. As a data compression algorithm, it provides a n:1 image compression ratio, while preserving edge feature information. In the biomedical field, one could use this algorithm to fuse data from different sensor modalities such as CAT, PET and MRI. For the remote sensing community, this algorithm provides a visualization tool for realizing the full edge information content in hyperspectral images, such as those obtained through satellite imaging. Such high-dimensional photometric data is not easily tractable by traditional methods; in this context this new method yields a useful data analysis tool.

Perhaps the simplest possible transformation from a multispectral image to a grayscale image is averaging of the spectral bands. This produces a visualizable image which contains information from all the bands in a unified way. However, this method fails to take into account any measure of the information content in the dataset. A minor modification can be obtained by considering a weighted average, where different bands will contribute differently to the final result, depending on some pre-assigned assesment of their relative relevance in the overall image. Since it may be difficult or even impossible to determine a priori which bands should be emphasized over others, this method suffers from similar problems as unweighted averaging.

In order to overcome the shortcomings of averaging methods, statistical information about the multispectral image can be taken into account. Principal Component Analysis (PCA) achieves this by considering an n-band image as a set of vectors in an n-dimensional vector space. PCA obtains a one-band image from a multispectral image by projecting the entire distribution of spectral values onto the line spanned by the eigenspace of the covariance matrix with largest eigenvalue, and then perhaps re-scaling the result to fit the dynamic range of the output device (printer, monitor, etc). The difference then, between PCA and weighted averaging is that the line onto which projection is chosen is selected ahead of time in the latter, whereas in the former it is determined by the global statistics of the particular image at hand. However, since both methods have a common geometric foundation, they share a common problem. To see this clearly consider the following argument. It is easy to see that the cosine of the angle $\theta$ between any diagonal vector in an n-dimensional vector space and any one of the coordinate axis is given by $\cos\theta = 1/\sqrt{n}$. Hence as the dimension increases, diagonals tend to become orthogonal to the coordinate axes. Upon projecting the spectral measurements onto a fixed axis or a principal axis in photometric space, the contrast between adjacent pixels is always foreshortened, and it follows from the foregoing that this phenomenon becomes more severe as the dimensionality of the data increases.

Briefly, then, according to the present invention a method is presented for the treatment and visualization of local contrast in n-dimensional multispectral images, which directly applies to n-dimensional multisensor images as well. A 2×2 matrix called the contrast form is defined comprised of the first derivatives of the n-dimenional image function with respect to the image plane, and a local metric defined on n-dimensional photometric space. The largest eigenvector of this 2×2 contrast form encodes the inherent local contrast at each point on the image plane. It is shown how a scalar intensity function defined on n-dimensional photometric space is used to select a preferred orientation for this eigenvector at each image point in the n-dimensional image defining the contrast vector field for an n-dimensional image. A grey level visualization of local n-dimensional image contrast is produced by the greylevel image intensity function such that the sum of the square difference between the components of the gradient vector of this intensity function and the components of the contrast vector field is minimized across the image plane. This is achieved by solving the corresponding Euler-Lagrange equations for this variational problem. An m-dimensional image, 1<m<n, visualization of n-dimensional data is produced by an m-dimensional image function such that the sum of the square difference between the components of the contrast form of this m-dimensional image and the components of the contrast form for the n-dimensional image is minimized across the image plane.

BRIEF DESCRIPTION OF THE DRAWINGS

The foregoing, and additional objects, features and advantages of the present invention will be apparent to those of skill in the art from the following detailed description of a preferred embodiment thereof, taken with the accompanying drawings, in which.

DESCRIPTION OF THE PREFERRED EMBODIMENT

Figure 1:
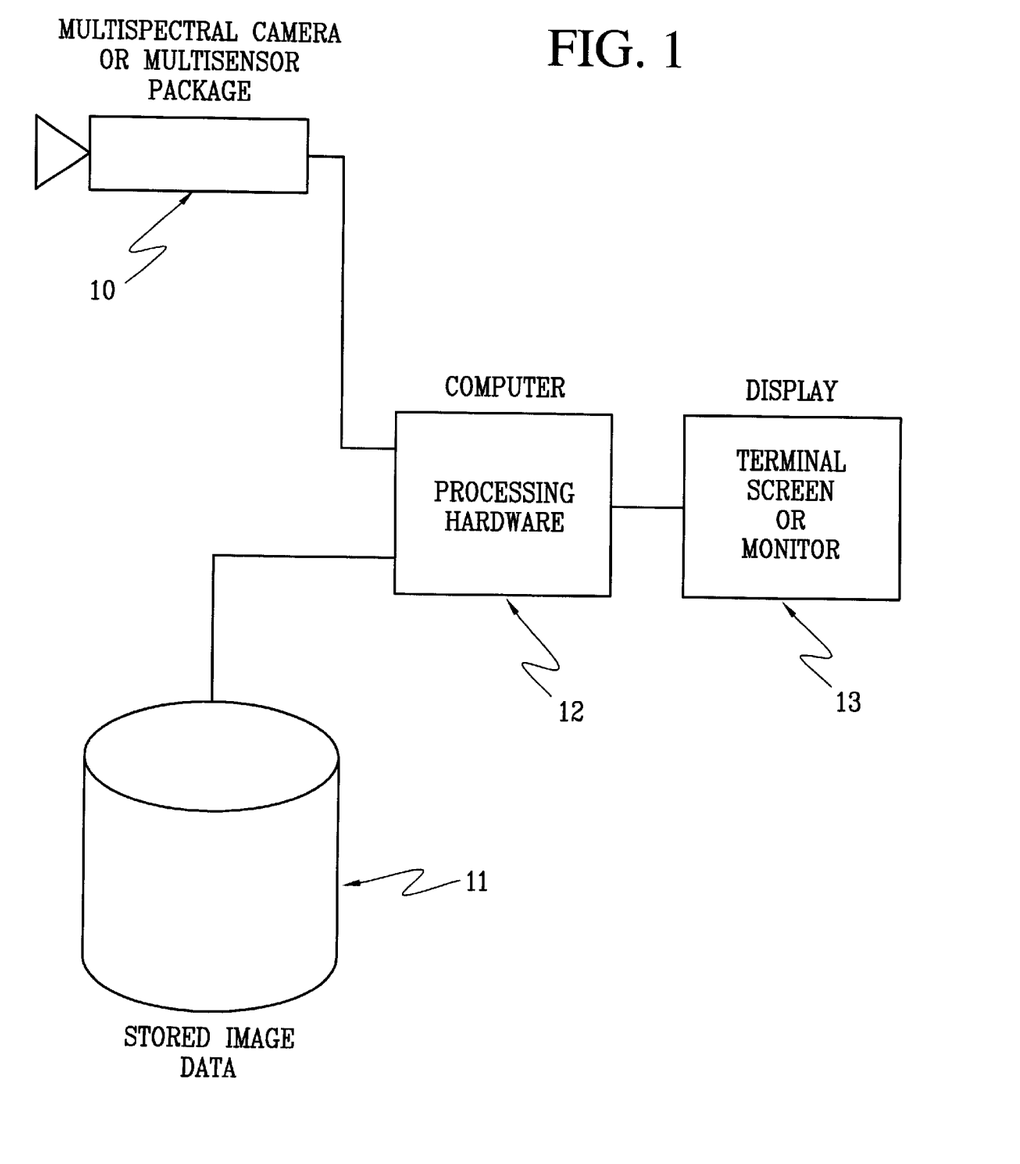
FIG. 1 shows an overview of the hardware system for performing the method of the present invention.
Figure 2:
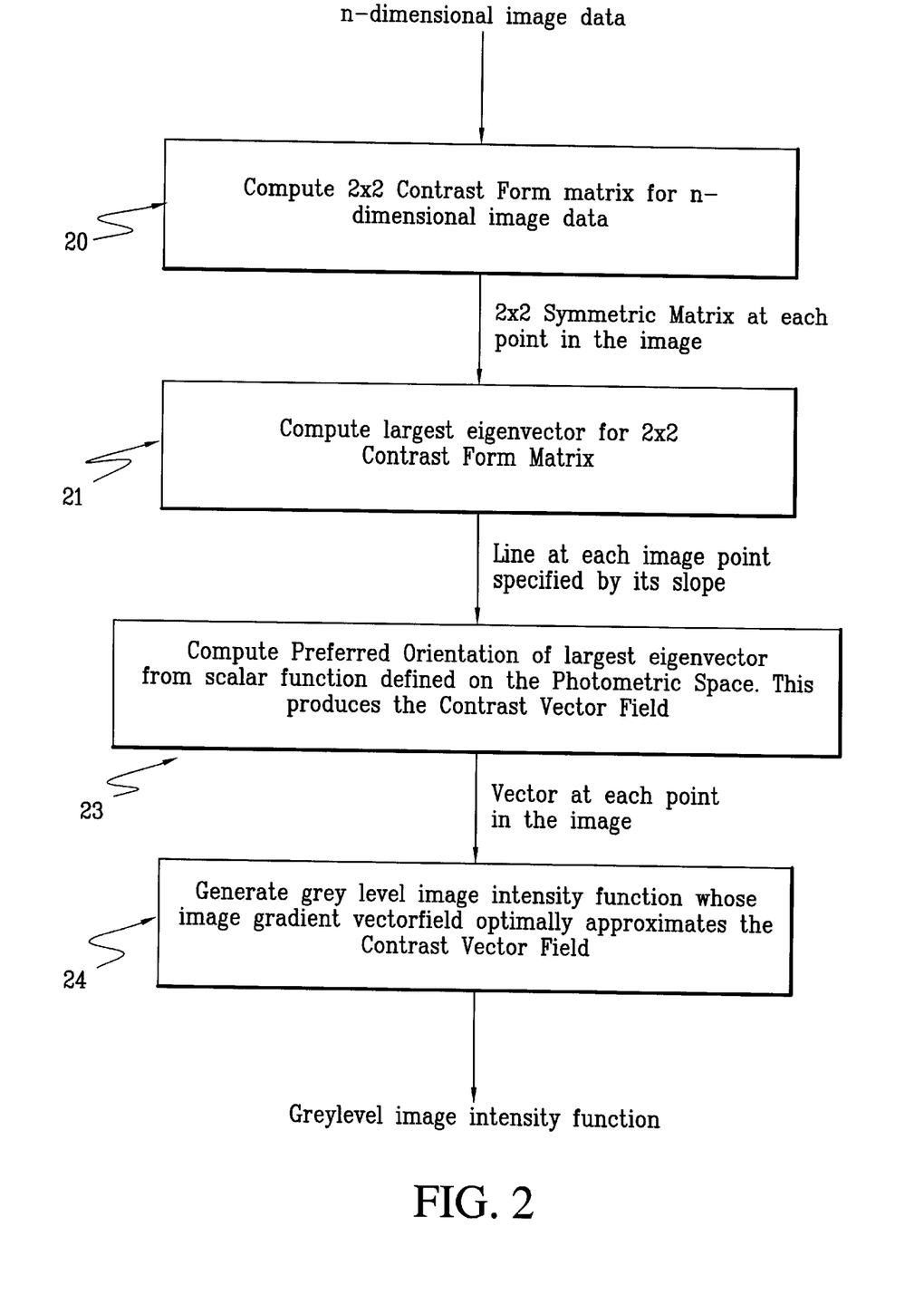
FIG. 2 shows a high-level Flow diagram of the method.

By a multiband image, is meant a rectangle $I \subset R^2$ together with a spectral map $s: I \rightarrow P$, where P denotes n-dimensional photometric space. It is assumed that P is given an "extended" RGB coordinate system, in which each band takes on values between 0 and 255. The extension to other coordinate systems is straightforward. In this context, a grayscale image is a multiband image I for which s maps all of I into the diagonal of P. Let P have an arbitrary Riemannian metric g, which allows the use of metrics well-adapted to computer vision. Multiband images are a mathematical representation of the data obtained by multi-spectral sensors shown as 10 in FIG. 1. FIG. 2 shows a multiband image 20 being passed to the beginning point of our method from which the contrast form is derived 21 as described below.

For the remainder, let I be a multiband image with spectral map s, let P be a point in I, and v an arbitrary unit vector in $R^2$. In analogy with the grayscale case, define the contrast in I at p in the direction of v as the speed of spectral variation within the image in that direction. To do so, consider the following construction. Let $\gamma:[-\epsilon,\epsilon] \rightarrow I$ be a curve defined on a small interval, such that $\gamma(0)=P$ and $\gamma'(0)=v$. The speed of spectral variation at p in the direction of v is given by the magnitude of the vector $$s_*(v) \equiv \frac{d}{dt}(s \circ \gamma)(t)|_{t=0},$$

as evaluated by the metric of P. Note that since the metric of P is not assumed to be constant, this magnitude must be evaluated with respect to the metric at s(p). In the language of differential geometry, the vector $S_*(v)$ is called the pushforward of v by s, and its expression in local coordinates is given by $$s_*(v) = J_p v \tag{1}$$

where $J_p$ is the Jacobian matrix of s at the point p. Let $g_q$ denote the matrix for g at $q \in P$ with respect to a coordinate system. Then the contrast in I at p in the direction of v is given by the quantity $$(J_p v)^t g_{s(p)} (J_p v) = v^t (J_p^t g_{s(p)} J_p) v \tag{2}$$

Figure 3:
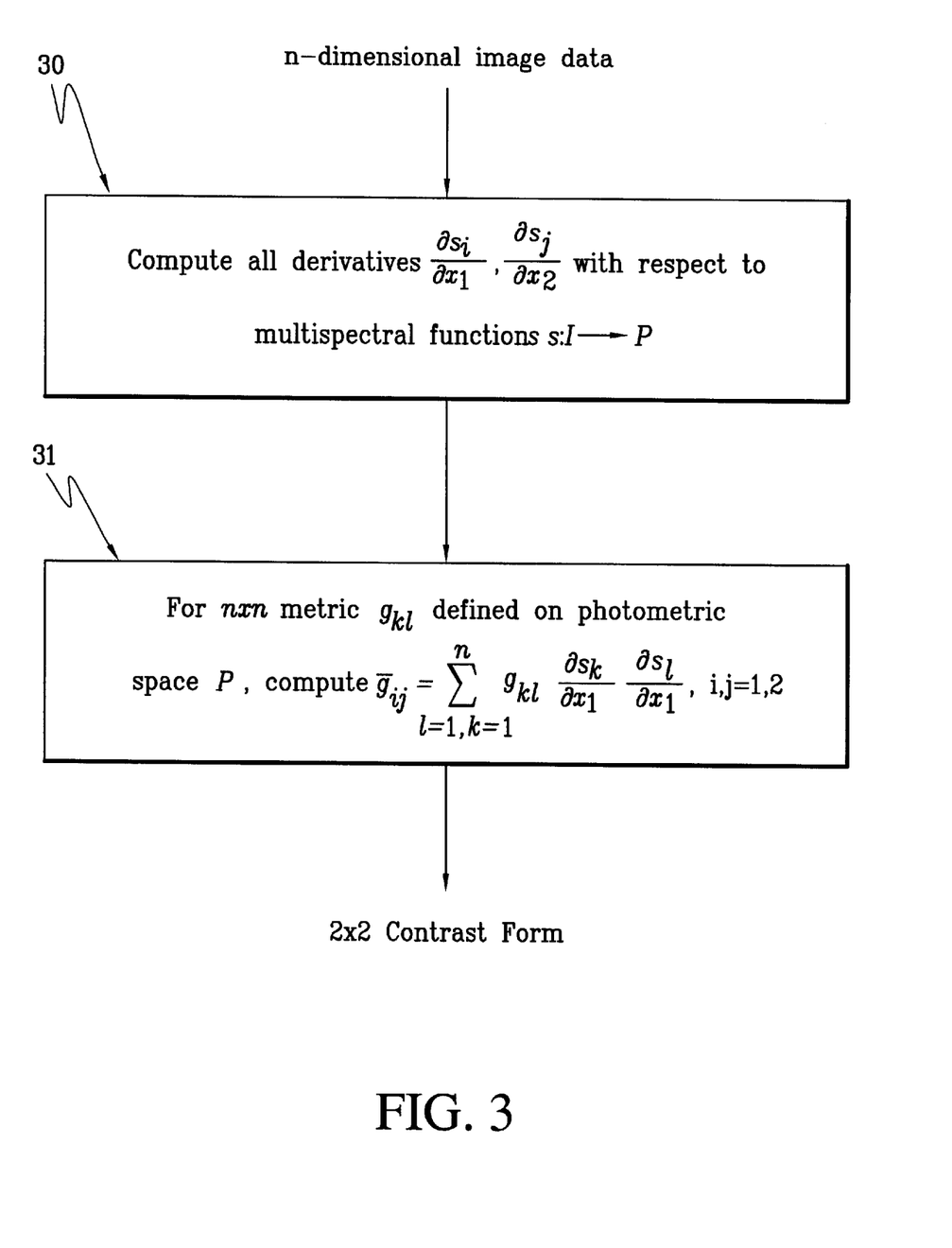
FIG. 3 shows a flow diagram for the computation of a contrast form.
Figure 4:
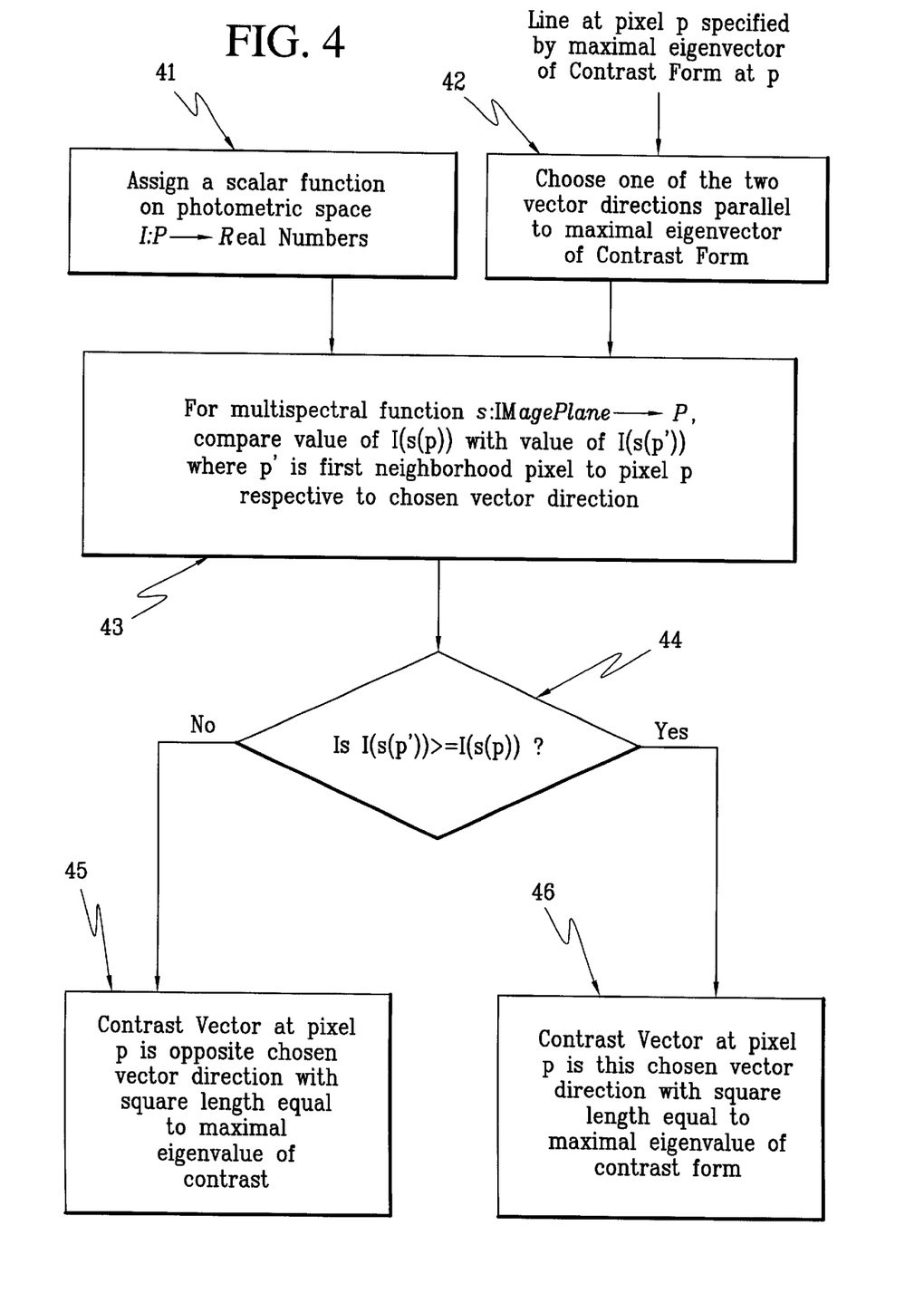
FIG. 4 shows a flow diagram for creating a Contrast Vector Field.

Let $g_p^s = (J_p^t g_{s(p)} J_p)$, thus $g_p^s(v) = v^t g_p^s v$. It follows from equation (1) that in a coordinate system the components of $g_p^s$ are given by $$(g_p^s)_{oj} = \sum_{k,l} (g_p)_{kl} \frac{\partial s_k}{\partial x_i} \frac{\partial s_l}{\partial x_j} \tag{3}$$

which is shown in 31 in FIG. 3. Finally, define $\chi(p) = g_p^s$ to be the contrast form of I. Thus the contrast in I at p in the direction of v is given by $\chi(P)(v)$. Once again, in the language of differential geometry, the differential form $\chi$ is called the pullback of g by s. From equation (3) $\chi(P)$ in 20 is a symmetric matrix with real entries, therefore its eigenvalues are both real and non-negative. Let $\lambda_p$ denote the largest eigenvalue of $\chi(P)$ 21. Define the absolute contrast in I at p to be equal to $\sqrt{\lambda_p/n}$ (where n is still the dimension of P), and the eigenspace of $\chi(P)$ corresponding to $\lambda_p$ is the direction of maximal contrast at p. Note that this direction does not have a preferred orientation a priori which is why the procedure is performed in FIG. 4.

It is important to see how these definitions reduce in the case where I is a grayscale image and P is given the standard Euclidean metric. Since s maps I to the diagonal of P, then s is of the form (i, i, ,i), $$\begin{pmatrix} i_x i_y \\ i_x i_y \\ i_x i_y \end{pmatrix} \tag{4}$$

where $i: I \rightarrow P$ is the intensity map, and s has n components. Using coordinates x, y on I and letting subscripts denote partial differentiation, the Jacobian matrix of s is and therefore $$\chi = n \begin{pmatrix} i_x^2 & i_x i_y \\ i_x i_y & i_y^2 \end{pmatrix} \tag{5}$$

The eigenvalues of this matrix can readily computed to be 0 and $n|\nabla i|^2$. Thus $\lambda_p = |\nabla i|$, and the direction of maximal contrast is the line spanned by $\nabla i$ Hence the standard notion of greyscale contrast is recovered. In this case, the direction of maximal contrast can be given the orientation determined by $\nabla i$. For a general multiband image, there is no canonical orientation for the direction of maximal contrast; this constitutes the main difference between multiband and greyscale images, in terms of contrast.

It follows from the previous considerations that two images carry the same contrast information if and only if they have the same contrast form. An apropriate measure of contrast difference between two versions of the same image is, therefore, the $L^2$ norm of the difference of their contrast vector fields. This quantity may be called the integral contrast difference (ICD) between the images. Also consider the pointwise maximum of the squared difference of the contrast vector fields, which is called the maximum contrast difference (MCD). Note that the contrast form of a multiband image will, in general, have two non-zero eigenvalues. Since the contrast form of a grayscale image, shown above, always has one null eigenvalue, the contrast information in a multiband image cannot, in general, be exactly reproduced by a grayscale image.

The Contrast Vector Field

The definition of contrast given in the previous section is not quite sufficient to tackle the problem of reduction of spectral dimension with optimal contrast. This is so precisely because there is no canonical orientation for the direction of maximal contrast at a given point in a multiband image. This is remedied by introducing such an orientation in a well-defined manner (FIG. 4).

Let $I(p)=dist(0,c(p))$, where 0 is the point in P all of whose coordinates are zero, and dist is the geodesic distance function for the metric of P. The function $I: I \to R$ is the spectral intensity function 41. Note that in the case of Euclidean photometric space we simply have $I(p)=\sqrt{\Sigma s_i(p)^2}$. In general, I induces an ordering on P, given by x>y\$ if $I(x)>I(y)$, for X,y∈P. The function dist could in principle be replaced here by any function $\phi: P \to R$ whose level sets are closed hypersurfaces which foliate P The spectral intensity defined using $\phi$ instead of dist would thus induce a different ordering of the set of colors.

Now, construct the contrast vector field V as follows. Let, once again, p∈I. Pick an arbitrary non-zero vector w in the direction of maximal contrast at p 42. If $(\nabla_w I)(p)>0$ 44 let Vp be the vector with the same direction and orientation as w and with length $\lambda_p$, 46. Otherwise let Vp have orientation opposite that of w, and length $\lambda_p$, 45. If P is given an arbitrary Riemannian metric, this procedure can be achieved by considering the sign of the Riemannian inner product between $s_*(w)$ and the outward unit normal to the geodesic sphere of radius $I(p)$ at $s(p)$ instead of the sign of $(\nabla_w I)(p)$. If a different function $\phi$ is chosen, then geodesic sphere' should be replaced by level set of $\phi$' in the previous sentence.

The contrast vetor field V constructed above, encodes the spectral contrast information of I, together with intensity information. It constitutes a bridge between the multiband and greyscale realms.

A numerical procedure is implemented for the solution of the problem, and experimental results are displayed, in the following section.

Mathematical Formulation

In light of the definitions made in the previous section, the statement of the problem is now the following: Given a multiband image $s: I \to P$ with contrast vector field V, find the greyscale image whose contrast vector field is closest to V. Equivalently, the function $i: I \to R$ is sought whose gradient is closest to V.

Figure 5:
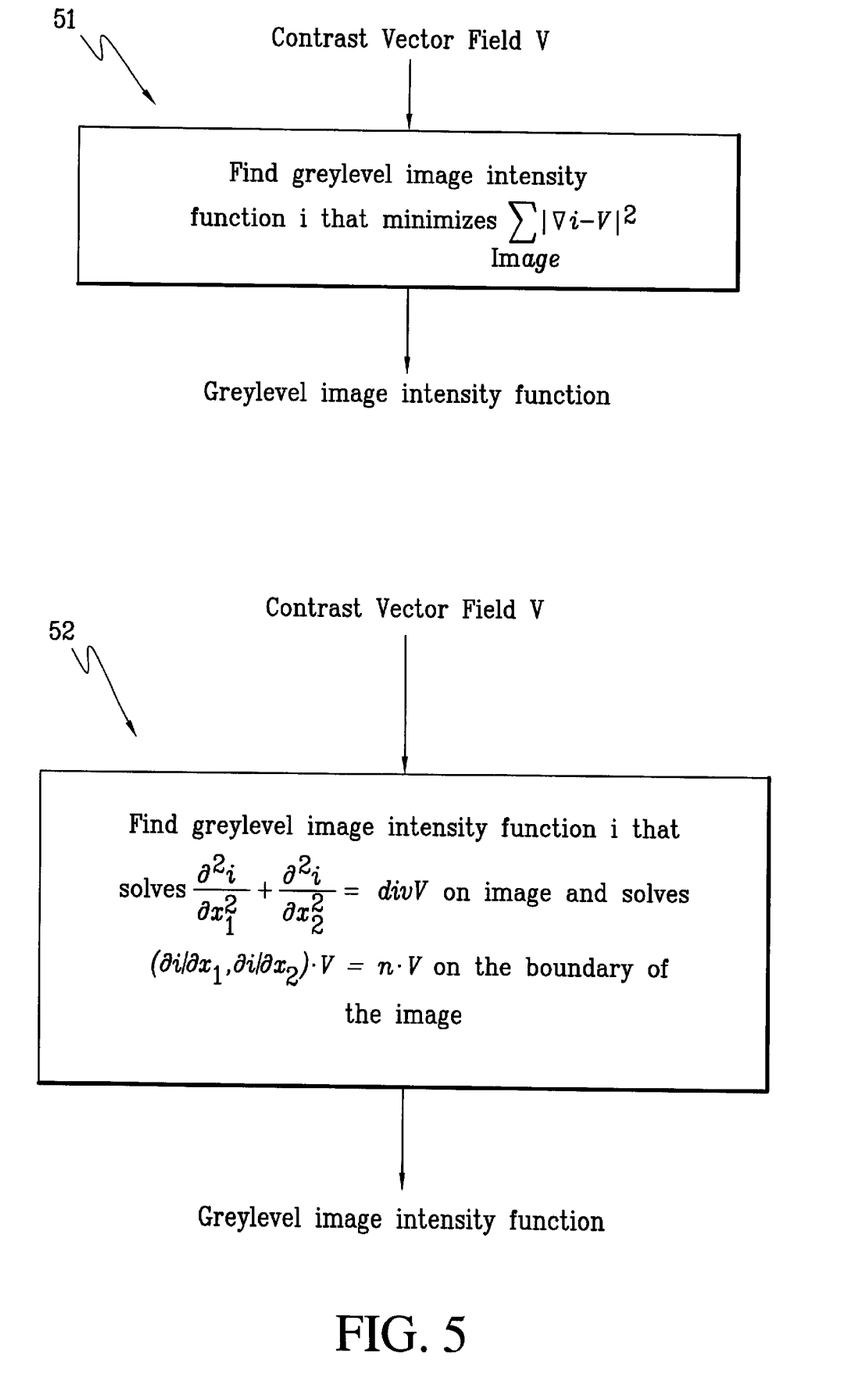
FIG. 5 shows a flow diagram for a greylevel intensity function having an intensity gradient which optimally approximates the Contrast Vector Field.

To find such a function, the equation $\nabla i = V$ needs to be solved. However, this equation will in general have no solution, since it follows that V need not be integrable. The new method proposes instead to find the function i for which the following functional is minimized 51.

$$\int\int_I |\nabla i - V|^2 dx dy \qquad (6)$$

The Euler-Lagrange equation for this functional can be easily found to be $$\Delta i = div V, \text{ on } I \qquad (7)$$

and the natural Neumann-type boundary condition is $$\nabla i \cdot V = n \cdot V, \text{ on } \partial I \qquad (8)$$

where n is the outward unit normal to I 52.

Figure 8:
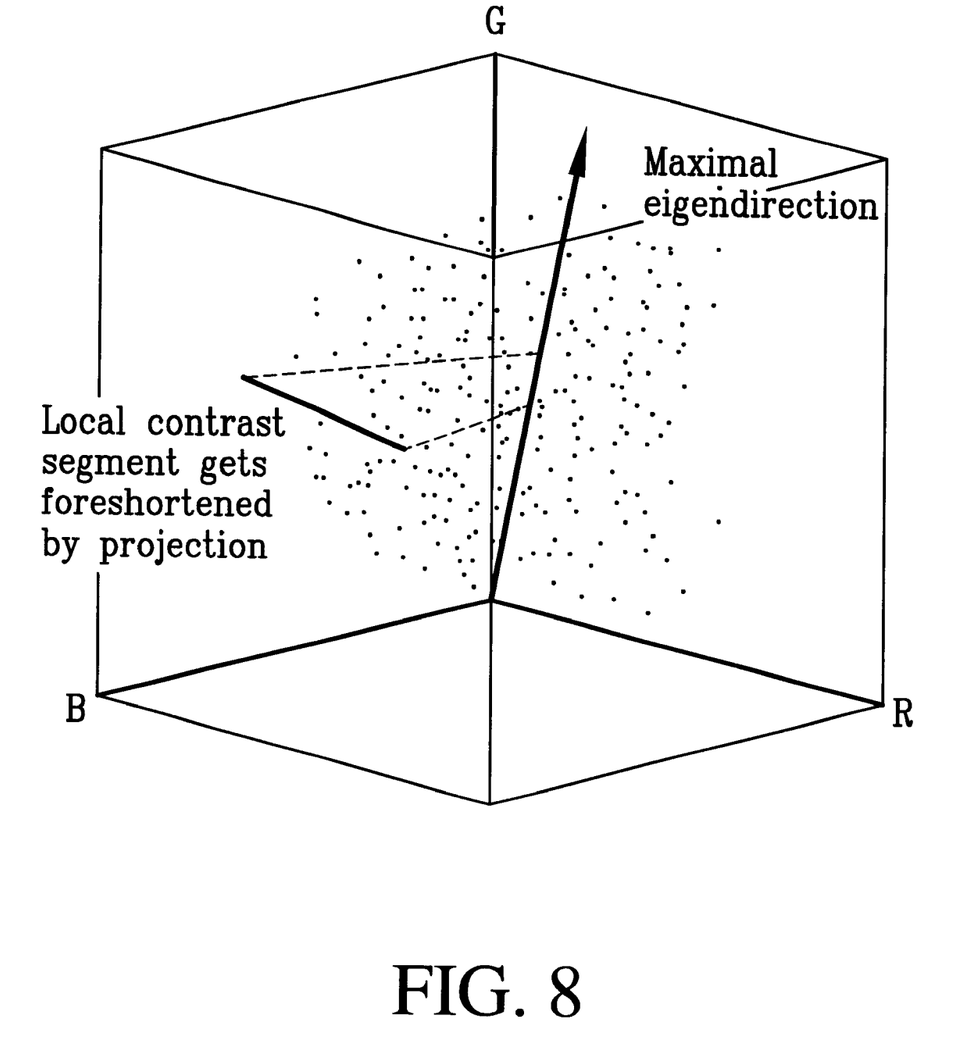
FIG. 8 shows a pictorial of a projection of n-dimensional image data onto a line produced by PCA or averaging, thereby foreshortening local contrast in the image.

Note that the problems of foreshortening of local contrast due to a global method, such as PCA (FIG. 8), are minimized with respect to this local method.

Numerical Solution

Figure 6:
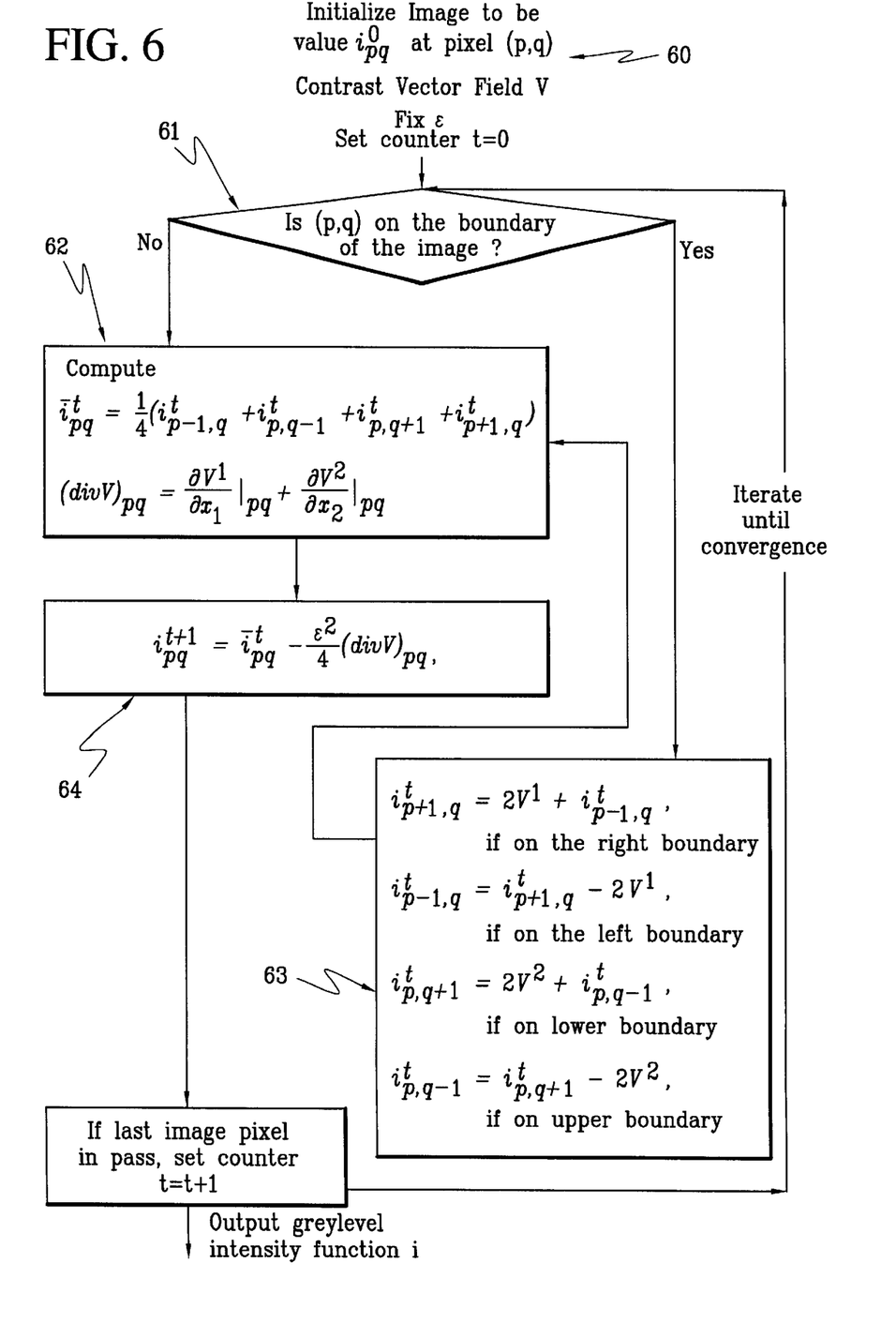
FIG. 6 shows a flow diagram of a numerical procedure for performing the intensity function of FIG. 5.

A straightforward iteration scheme to solve equation 7 with boundary condition 8 is presented. All the derivatives needed for the calculation of V and divV, are computed numerically finite differences.

Let $i_{pq}$ denote the value of i at the pixel with coordinates (p,q) in I. Let $\bar{i}_{pq}$ be the average of the values of i over the four pixels neighboring (p,q) (not counting diagonal neighbors) 62. Lastly, let $(divV)_{pq}$ be the value of divV at (p,q), computed as described above 62. Then the standard difference equation for 7 yields the iteration scheme $$i^{t+1}_{pq} = \bar{i}_{pq} - \frac{\varepsilon^2}{4}(divV)_{pq},$$

63 where $\varepsilon$ is the small displacement used to compute the derivatives by finite differences.

The boundary condition 8 translates into $$i_{p+1,q} - i_{p-1,q} = 2V^1, \text{ and} \qquad (10)$$

on vertical and horizontal boundary segments, respectively 64.

$$i_{p,q+1} - i_{p,q-1} = 2V^2, \qquad (11)$$

The values for $i^0$ can be chosen arbitrarily, as the scheme 9 will converge for any choice. Choose $i_{pq}^0$ to be the average value of the spectral bands at (p,q) 60. A different choice of initial condition will, in general, yield a different grayscale image, whose contrast also matches that of the original multiband image; it will differ from our solution only by an overall shift in grayscale values.

Noisy Data

It may be the case that all bands of a multispectral image have comparable resolutions, but still each band has different noise characteristics. This may be due to a number of reasons: different technologies are used for sampling at different wavelengths, penetration of the atmosphere at different wavelengths is not uniform, cloud cover in a satellite image may introduce noise only in the visible range, but not in the infrared, etc. In some of these cases, noise characteristics of the sensor at each band may be known {\ it a priori}. Consider the nxn covariance matrix associated to the sensor is computed (or interpolated) at each point in n-dimensional photometric space, yielding a positive definite bilinear form which can be thought related to a Riemannian metric on photometric space (e.g., the metric coefficients are obtained by taking the inverse of the covariance matrix). This metric encodes the noise characteristics of the sensor in such a way that unit (in the Euclidean norm) tangent vectors in the direction of noisier bands will have shorter lengths than those in the direction of bands of higher fidelity. This metric g is used in equation (3). The overall effect is to have the higher fidelity bands contribute more to the grayscale composite than those which are known to be noisier.

A Variation On the Reduction Problem

Figure 7:
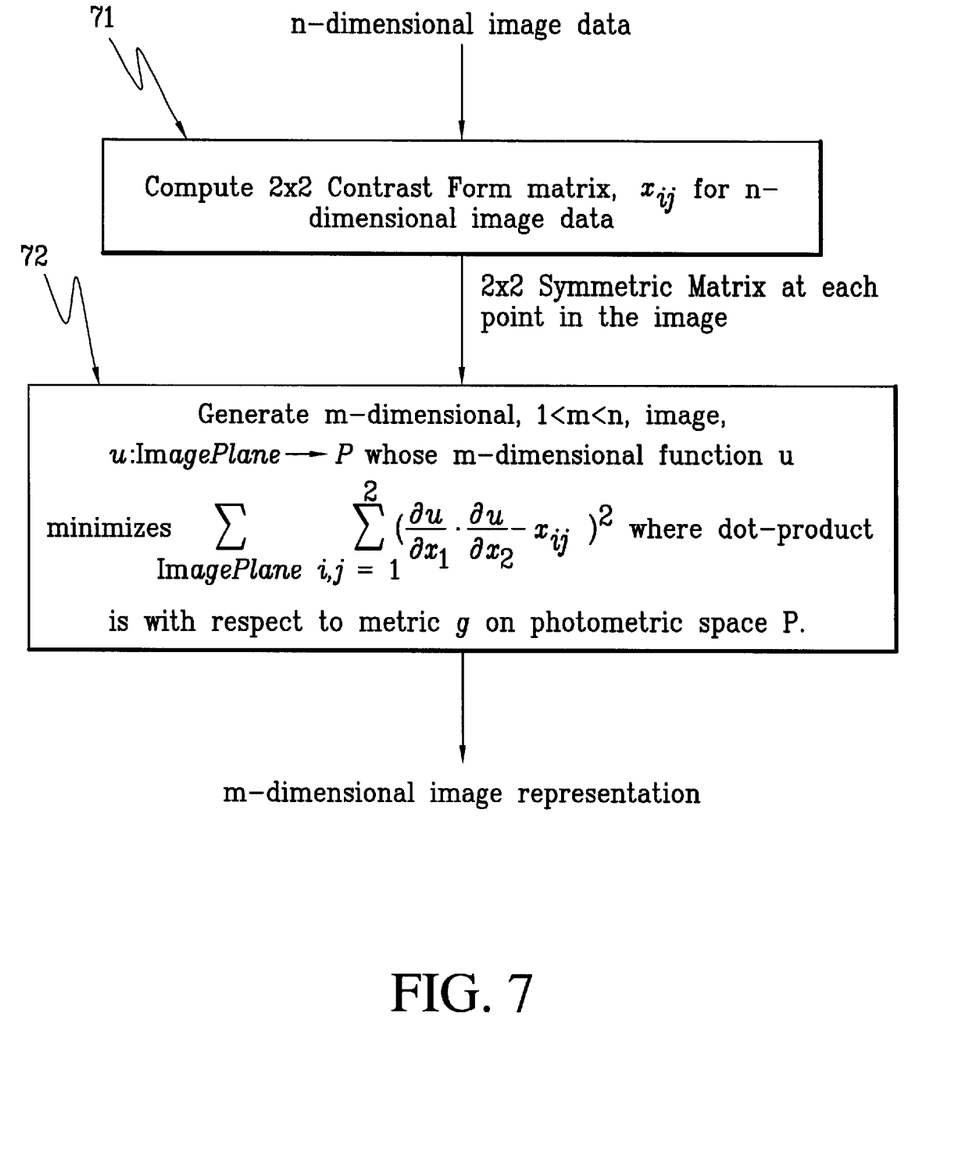
FIG. 7 shows a flow diagram for producing an m-dimensional image that optimally approximates the Contrast Form for a given n-dimensional image.

The problem of reduction of spectral dimension with optimal contrast stated above is concerned with the transformation of a multiband image to a single-band image. In essence, an image was found with a one-dimensional photometric space whose contrast matched that of the original image as closely as possible. Now let P and P' be photometric spaces of dimensions n and m, respectively, with n>m. If s:I→P is a multiband image, it is natural to ask what is the image s':I→P whose contrast form most closely matches that of s:I→P 72. This is precisely the problem treated above when m=1.

In general, the goal is to maximize the agreement with both eigenvalues $$u_i \cdot u_j = \chi_{ij}, \ 1 \leq i,j \leq 2. \qquad (12)$$

of $\chi$ 71. Thus find a solution u:I→P' satisfying where the scalar product is given by the Riemannian metric on P. Once $$\int\int_I \sum_{i,j=1}^{2} (u_i \cdot u_j - \chi_{ij})^2. \qquad (13)$$

again, this system need not have a solution, so a minimizer u for the functional 72 is found:

A computation shows that the Euler-Lagrange equations for 13 are $$[2(u_1 \cdot u_1 - \chi_{11})u_1 + (u_1 \cdot u_2 - \chi_{12})u_2]_1 + [2(u_2 \cdot u_2 - \chi_{22})u_2 + (u_1 \cdot u_2 - \chi_{12})u_1]_2 = 0.$$

These equations are not as easily tractable as equation 7.

Experimental Results

Figure 9A:
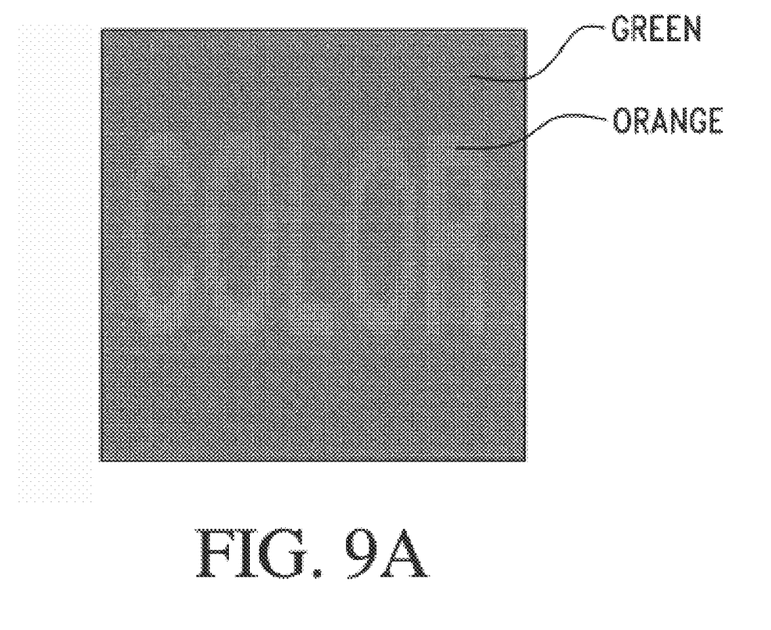
FIG. 9A shows an Ishihara color plate.

The algorithm was applied to several color images and the output was compared with that obtained by converting the multiband image into grayscale by traditional methods, such as averaging the three color bands, or taking the square root of the sum of the squared color intensities, multiplied by a suitable constant. The shades of color were taken from Ishihara color plates (FIG. 9A) and the pseudo-isochromatic color plates used to test for color blindness. The term pseudo-isochromatic refers to images whose colors have practically indistinguishable intensity values.

Figure 9B:
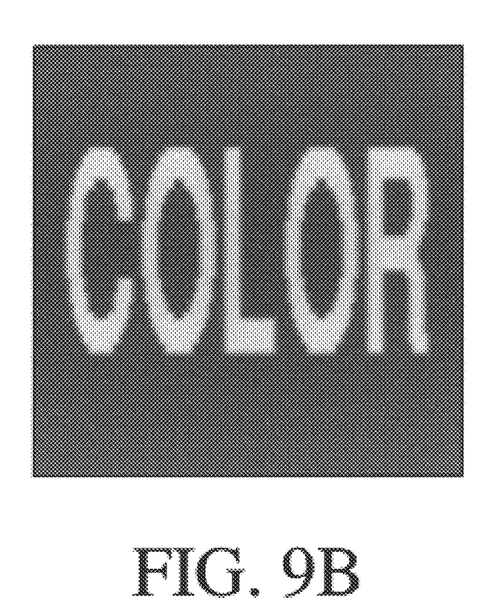
FIG. 9B shows an isointensity color image visualized in a greyscale representation using the method of the invention.

FIG. 9B illustrates the grey-level intensity results obtained using the present algorithm, which were significantly better than those obtained by traditional methods, when applied to images with pseudo-isochromatic characteristics. The effect on images with high intrinsic contrast was not quite as striking, but the numerical results showed marked improvement as well.

Figure 10:
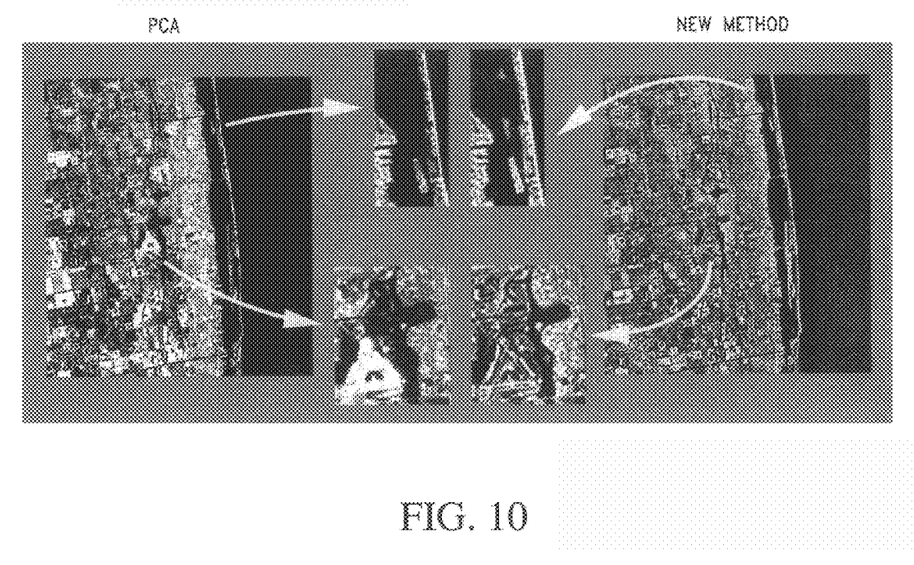
FIG. 10 shows a greyscale visualization of a 12-band EOSAT image over Florida, as compared with PCA.

As an example of our current multispectral work FIG. 10 shows a comparison of grey level visualization of a 12-band EOSAT multispectral aerial image over a portion of Florida in accordance with the invention, compared with PCA. The greylevel visualization image on the left was produced by a standard method of projecting $12$-band photometric values onto the principal component axis. The greylevel visualization image on the right was produced by the new method which optimally preserves local multispectral image contrast in a greylevel visualization. Some subimage portions have been enlarged in FIG. 10 to more clearly show the vast improvement in local contrast information that is represented by our new visualization technique. Notice the additional detail supplied to an image analyst for identifying the airport runways in the lower subimage and the islands that are identified in the upper subimage by our technique but not adequately represented using principal components analysis.

Conclusion

The analytic definition of contrast applicable to a general multiband image showed how the present definition agrees with the standard one in the case of a grayscale image. In a multiband image, contrast does not have a canonical orientation, and therefore a partial ordering on the set of colors must be introduced. Using a geometric ordering, a well-defined orientation is assigned to the direction of maximal contrast in a multiband image, and thence a vector field is produced with content comparable to that of the gradient of an intensity function. The problem of reduction of spectral dimension with optimal contrast was stated in terms of this vector field, and a mathematical formulation was obtained. Numerical methods allowed production of an algorithm to implement the solution by means of a convergent iteration scheme. Experimental results showed that the algorithm does indeed produce a solution to the problem, and the formulation is thus confirmed a fortiori.

What is claimed is:

1. A method for reproducing the local contrast inherent to an n-dimensional image at each point in the image as the intensity gradient of a grey level intensity image, comprising:

determining a local 2×2 contrast form matrix for an n-dimensional image defined at each image point;

computing a maximal eigenvector for the 2×2 contrast form matrix at each image point;

establishing a preferred direction for the maximal eigenvector using a scalar intensity function on photometric space to produce a contrast vector field for the n-dimensional image; and computing a greylevel intensity function having a gradient vector field which has least square residual error with respect to the contrast vector field for the n-dimensional image across the image plane.

2. A method as in claim 1, wherein computing a maximal eigenvector includes optimally reproducing the maximal eigenvector of the contrast form for an n-dimensional image at each point in the image as a parallel intensity gradient vector of a grey level intensity image.

3. A method as in claim 2, wherein computing a maximal eigenvector includes producing a preferred orientation according to a scalar function on photometric space and wherein the intensity gradient vector of the grey level intensity image is equal to this vector.

4. A method as in claim 3, including minimizing the sum of the residual square error difference over each point in the image between the intensity gradient vector and the maximal eigenvector of the contrast form.

5. A method as in claim 4, further including visualizing an n-dimensional image.

6. A method as in claim 4, further including visualizing an n-band multispectral image.

7. A method as in claim 4, including visualizing a color image as a grey scale intensity image.

8. A method as in claim 4, including visualizing an n-dimensional image from respective n different image sensors.

9. A method as in claim 4, further including compressing an n-dimensional image.

10. A method for reproducing the contrast form for an n-dimensional image at each point in the image as an m-dimensional image, $1<m<n$, with equivalent contrast form, comprising:

determining a local 2×2 contrast form matrix for an n-dimensional image defined at each image point;

computing a maximal eigenvector for the 2×2 contrast form matrix at each image point;

establishing a preferred direction for the maximal eigenvector using a scalar intensity function on photometric space to produce a contrast vector field for the m-dimensional image; and computing a greylevel intensity function having a gradient vector field which has least square residual error with respect to the contrast vector field for the m-dimensional image across the image plane.

11. A method as in claim 10, further including minimizing the sum of the residual square error difference over each point in the image between the components of the contrast form for the n-dimensional image and for the m-dimensional image.

12. A method as in claim 11, further including visualizing an n-dimensional image.

13. A method as in claim 11, further including color visualization of an n-dimensional image.

14. A method as in claim 11, further including color visualization of an n-dimensional image from respectively n different image sensors.

15. A method as in claim 11, further including image compression of an n-dimensional image.

* * * * *